United States Patent
Huang

(10) Patent No.: US 9,811,870 B2
(45) Date of Patent: Nov. 7, 2017

(54) INFORMATION PROCESSING METHOD, APPARATUS AND PAYMENT SYSTEM

(71) Applicant: Tencent Technology (Shenzhen) Company Limited, Shenzhen (CN)

(72) Inventor: Canhui Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 540 days.

(21) Appl. No.: 14/483,045

(22) Filed: Sep. 10, 2014

(65) Prior Publication Data

US 2015/0178878 A1  Jun. 25, 2015

Related U.S. Application Data

(63) Continuation of application No. PCT/CN2014/079646, filed on Jun. 11, 2014.

(30) Foreign Application Priority Data

Dec. 24, 2013 (CN) .......................... 2013 1 0724227

(51) Int. Cl.
*G06Q 30/06* (2012.01)
*G06Q 50/34* (2012.01)
(Continued)

(52) U.S. Cl.
CPC ......... *G06Q 50/34* (2013.01); *G06F 3/04842* (2013.01); *G06Q 20/322* (2013.01); *G06Q 30/0633* (2013.01)

(58) Field of Classification Search
None
See application file for complete search history.

(56) References Cited

U.S. PATENT DOCUMENTS 7,633,076 B2 * 12/2009 Huppi ............... H04M 1/72563
　　　　　　　　　　　　　　　　　　　　　250/559.36
2006/0197753 A1 * 9/2006 Hotelling ............... G06F 1/1626
　　　　　　　　　　　　　　　　　　　　　345/173

(Continued)

FOREIGN PATENT DOCUMENTS

CN　　　　　1801223 A　　　7/2006
CN　　　　102629397 A　　　8/2012
(Continued)

OTHER PUBLICATIONS

Accelerometers and Randomness: Perfect Together (by Voris, Saxena, and Halevi) published WiSec in Jun. 2011.*

(Continued)

*Primary Examiner* — Courtney L Stopp
(74) *Attorney, Agent, or Firm* — Morgan, Lewis & Bockius LLP

(57) ABSTRACT

A portable electronic device for presenting a recommendation message is described. The device includes display; one or more processors; and memory storing one or more programs for execution by the one or more processors. The device detects a trigger event based on a user input, the trigger event initiating a receipt of non-tactile user input; and, in response to detecting the trigger event, receives non-tactile user input. The device generates one or more character strings based on the non-tactile user input and one or more predefined string generation rules. Each character string of the one or more character strings includes multiple characters. The device generates a recommendation message that includes the one or more character strings; and displays the recommendation message on the display. A corresponding method and a computer readable storage medium storing one or more programs for execution by the portable electronic device are also described.

21 Claims, 11 Drawing Sheets

(51) Int. Cl.
*G06F 3/0484* (2013.01)
*G06Q 20/32* (2012.01)

(56) References Cited

U.S. PATENT DOCUMENTS

| | | | |
|---|---|---|---|
| 2008/0300055 A1* | 12/2008 | Lutnick | G07F 17/3209 463/39 |
| 2010/0188334 A1* | 7/2010 | Yamamoto | G06F 3/0346 345/158 |
| 2011/0264645 A1* | 10/2011 | Mital | G06F 3/0482 707/708 |
| 2012/0068835 A1* | 3/2012 | Li | G06F 3/016 340/407.2 |
| 2014/0121003 A1* | 5/2014 | Mueller | A63F 13/12 463/25 |
| 2015/0178490 A1* | 6/2015 | Tamboly | G06F 21/46 726/4 |
| 2015/0332540 A1* | 11/2015 | Roy | G07F 17/329 463/17 |

FOREIGN PATENT DOCUMENTS

| | | |
|---|---|---|
| JP | 2004240760 A | 8/2004 |
| KR | 20030084235 A | 11/2003 |
| TW | M464770 U | 11/2013 |

OTHER PUBLICATIONS

Tencent Technology, ISR, PCT/CN2014/079646, Sep. 26, 2014, 2 pgs.
Tencent Technology, Written Opinion, PCT/CN2014/079646, Sep. 26, 2014, 4 pgs.
Tencent Technology, IPRP, PCT/CN2014/079646, Jun. 28, 2016, 5 pgs.

* cited by examiner

1300

1302 Detect a trigger event based on a user input. The trigger event initiates a receipt of non-tactile user input.

> 1304 The portable electronic device includes a touch-sensitive surface configured for receiving a tactile input and one or more non-tactile sensors. The trigger event based on the user input is detected by the touch-sensitive surface. The non-tactile user input is received by at least one of the one or more non-tactile sensors.
>
> > 1306 The one or more non-tactile sensors include one or more of: a motion sensor configured to detect shaking or swaying of the portable electronic device; a sound sensor configured to receive a voice input; and a light sensor configured to detect light.

1308 In response to detecting the trigger event, receives non-tactile user input

1310 Generate one or more character strings based on the non-tactile user input and one or more predefined string generation rules. Each character string of the one or more character strings includes multiple characters.

> 1312 The one or more character strings include a set of random numbers generated based on the non-tactile user input
>
> 1314 A portion of the non-tactile user input that satisfies one or more predefined criterion is used for generating the one or more character strings
>
> 1316 amplitude of the non-tactile user input is used for generating the one or more character strings
>
> 1318 the one or more character strings include recommended numbers for a lottery ticket (A)

FIG. 13A

INFORMATION PROCESSING METHOD, APPARATUS AND PAYMENT SYSTEM

RELATED APPLICATIONS

This application is a continuation application of PCT Patent Application No. PCT/CN2014/079646, entitled "INFORMATION PROCESSING METHOD, APPARATUS AND PAYMENT SYSTEM" filed on Jun. 11, 2014, which claims priority to Chinese Patent Application Serial No. 201310724227.6, entitled "INFORMATION PROCESSING METHOD, APPARATUS AND PAYMENT SYSTEM" filed Dec. 24, 2013, both of which are incorporated by reference herein in their entirety.

TECHNICAL FIELD

The present application relates to the field of computer application technologies, and particularly to information processing methods, apparatus and payment systems.

BACKGROUND

With development of computer technologies and network technologies, people basically can get various kinds of information anytime, anywhere. For users' work and life, operators also can provide various kinds of recommendation messages for users, for example, recommend the users tourist information, hotel information, and even provide lottery number recommendation and other types of information recommendation.

The recommendation messages such as lottery number recommendation are mostly provided by a server or generated by a user in a manner of manual input through a keyboard or the like. A traditional recommendation message requires user's manual input, which is cumbersome and unnecessarily takes user's valuable time.

SUMMARY

The above-discussed technical problems are addressed by methods and systems described below.

In accordance with some embodiments, a method for presenting a recommendation message is performed by a portable electronic device with display, memory and one or more processors. The method includes detecting a trigger event based on a user input, the trigger event initiating a receipt of non-tactile user input; in response to detecting the trigger event, receiving non-tactile user input; and generating one or more character strings based on the non-tactile user input and one or more predefined string generation rules. Each character string of the one or more character strings includes multiple characters. The method also includes generating a recommendation message that includes the one or more character strings; and displaying the recommendation message on the display.

In accordance with some embodiments, a portable electronic device for presenting a recommendation message includes display; one or more processors; and memory storing one or more programs for execution by the one or more processors. The one or more programs including instructions for detecting a trigger event based on a user input, the trigger event initiating a receipt of non-tactile user input; in response to detecting the trigger event, receiving non-tactile user input; and generating one or more character strings based on the non-tactile user input and one or more predefined string generation rules. Each character string of the one or more character strings includes multiple characters. The one or more programs also include generating a recommendation message that includes the one or more character strings; and displaying the recommendation message on the display.

In accordance with some embodiments, a computer readable storage medium stores one or more programs for execution by one or more processors of a portable electronic device. The one or more programs include instructions for detecting a trigger event based on a user input, the trigger event initiating a receipt of non-tactile user input; in response to detecting the trigger event, receiving non-tactile user input; and generating one or more character strings based on the non-tactile user input and one or more predefined string generation rules. Each character string of the one or more character strings includes multiple characters. The one or more programs also include generating a recommendation message that includes the one or more character strings; and displaying the recommendation message on the display.

BRIEF DESCRIPTION OF THE DRAWINGS

The aforementioned features and advantages thereof as well as additional features and advantages thereof will be more clearly understood hereinafter as a result of a detailed description of embodiments when taken in conjunction with the drawings.

FIGS. 13A-13B illustrate a flow chart of an exemplary method for presenting a recommendation message in accordance with some embodiments.

Like reference numbers refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solution in the embodiments will be clearly and fully described below with reference to the accompanying drawings in the embodiments. It is obvious that the embodiments to be described are only exemplary embodiments. The embodiments described herein are not intended to limit the scope of claims.

Figure 1:
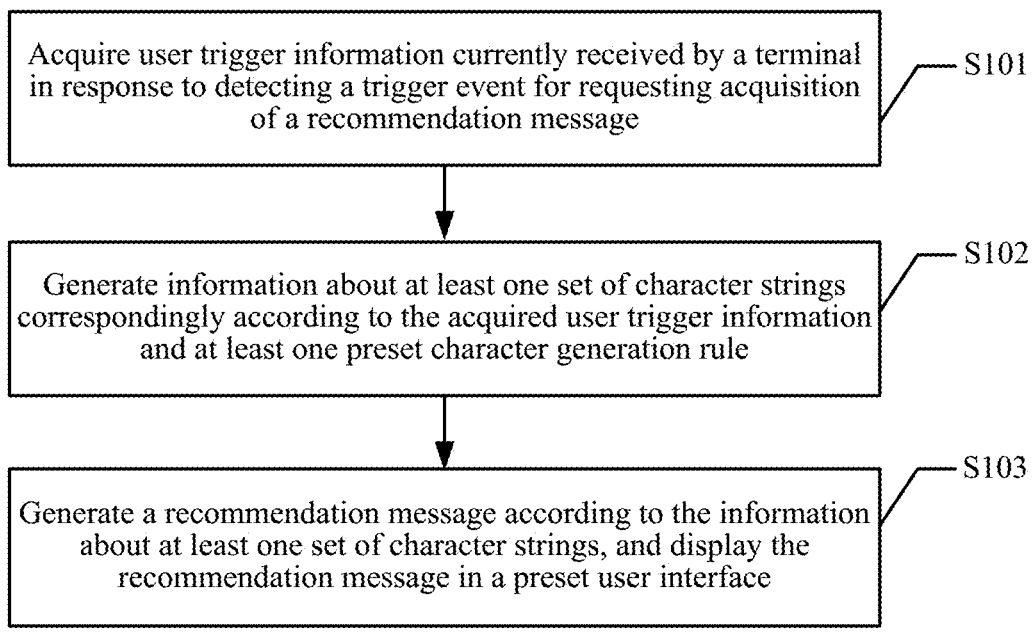
FIG. 1 is a schematic view of a flow of an information processing method according to some embodiments.

FIG. 1 is a schematic view of a flow of an information processing method according to some embodiments. The method illustrated in FIG. 1 may be implemented in mobile smart devices such as tablet PCs, mobile phones, e-readers, remote controls, vehicle equipment or wearable devices. The method includes the following steps.

S101: Acquire user trigger information currently received by a terminal in response to detecting a trigger event for requesting acquisition of a recommendation message.

For example, corresponding function buttons may be set in applications of the terminal, such as instant messaging applications, social networking applications and payment applications. In some embodiments, a user generates a trigger event for requesting acquisition of a recommendation message with respect to the terminal by clicking on the function buttons.

In some embodiments, the user trigger information currently received by the terminal includes: user trigger information related to the user's shaking or swaying of the terminal (e.g., information such as frequency or amplitude of movement of the terminal during the shaking or swaying), voice information input by the user through a microphone of the terminal (e.g., sound amplitude or frequency or other information), and optical information input by the user for a camera of the terminal (e.g., information about light intensity or light flickering frequency).

After the trigger event for requesting acquisition of a recommendation message is detected, an application programming interface (API), such as a terminal movement information API, a voice information acquisition API, an optical signal acquisition API and the like, is called to acquire user trigger information currently sent by the user to the terminal. In some embodiments, the API is called from one or more applications such as instant messaging applications, social networking applications and payment applications. In some embodiments, user trigger information currently sent by the user to the terminal is acquired by a gravity sensor, a sound sensor, an optical sensor, or other apparatuses of the terminal. In some embodiments, the acquired user trigger information is original data (also called raw data) output by the gravity sensor, the sound sensor, the optical sensor, or other apparatuses of the terminal. In some embodiments, the acquired user trigger information is processed data, such as movement locus data, sound amplitude or frequency, light intensity or light flickering frequency and other information, which are obtained by processing the raw data.

S102: Generate information about at least one set of character strings according to the acquired user trigger information and at least one preset character generation rule.

In some embodiments, the character generation rule is configured as required. In some embodiments, the character generation rule includes one or more combinations of the following manners: randomly generating a corresponding character string when acquiring the user trigger information, generating a corresponding character string according to a specified array format after acquiring the user trigger information, and generating a corresponding character string according to frequency and/or amplitude and other information corresponding to the user trigger information and according to a specified array format. In some embodiments, different character string information is determined respectively in S102. For example, in terms of the lottery, when it is acquired that the terminal is moving, it is feasible to randomly generate a set of character strings including seven number combinations, or generate a set of character strings including seven number combinations according to movement frequency and/or amplitude at the same time.

In some embodiments, the user trigger information is generated when the user operates the terminal once. For example, when the user shakes the terminal once, the operation at S102 is performed, to directly generate information about a set of character strings according to data corresponding to the shaking of the terminal. In some embodiments, the user trigger information is generated when the user operates the terminal multiple times. For example, when the user shakes the terminal left and right multiple times, the operation at S102 is performed and multiple character strings are sequentially generated based on the frequency or amplitude or the like of each shaking.

S103: Generate a recommendation message according to the information about at least one set of character strings, and display the recommendation message in a preset user interface.

In S103, the generated character strings are edited specifically according to a preset character display template, for example, for the set of character strings including seven number combinations generated in terms of the lottery, in the operation at S103, 6+1 display is presented to a preset display panel for the lottery. If necessary, different colors may be used to distinguish each character (number) in the character strings.

In accordance with some embodiments, the user interface is a human-machine interaction interface, which not only can display the recommendation message, but also can acquire a response operation of the user for the displayed recommendation message, for example, add, delete, modify and other user operations, and confirm a recommendation operation and the like.

In accordance with some embodiments, the user interface displays related information before generation and after generation of the recommendation message.

Figure 2:
FIG. 2 is a schematic view of a user interface before generation of a recommendation message according to some embodiments.

For example, FIG. 2 is a schematic view of an exemplary user interface before generation of a recommendation message according to some embodiments. Through the interface shown in FIG. 2, the user can more intuitively choose to obtain related character strings by means of shaking, swaying, voice recording or lighting.

Figure 3:
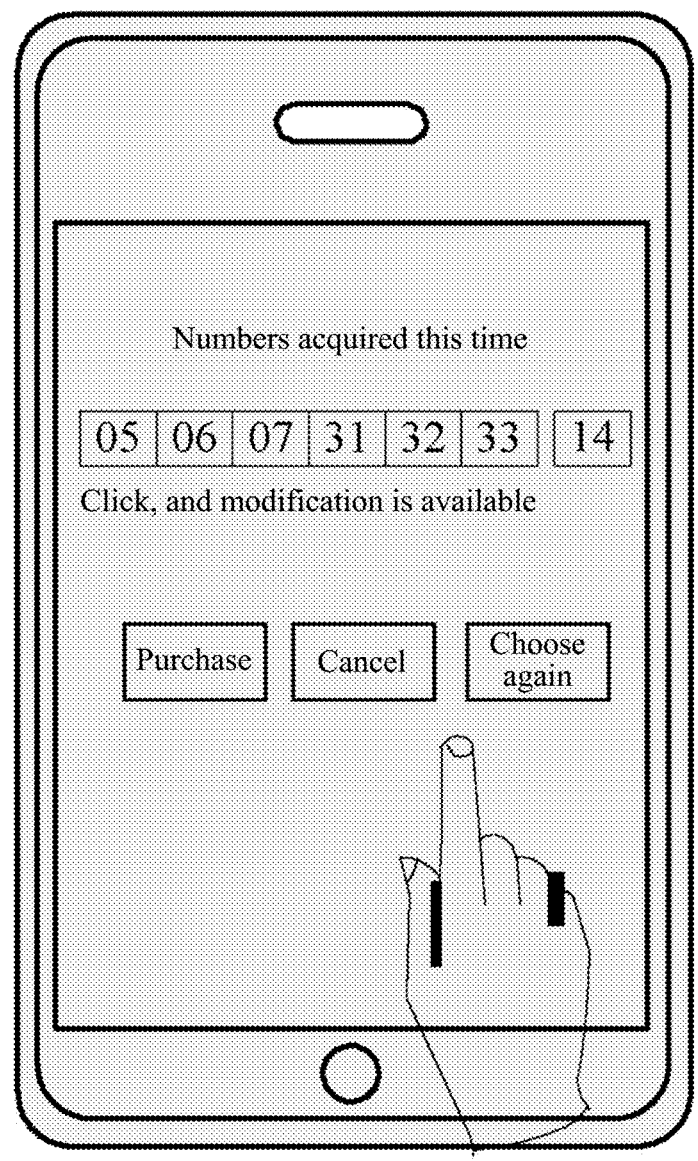
FIG. 3 is a schematic view of a user interface according to some embodiments.

FIG. 3 is a schematic view of a user interface in accordance with some embodiments. Through the interface shown in FIG. 3, the user can view the obtained character strings and perform some subsequent operations. Human-machine interaction based on a recommendation message can be achieved through the user interface.

In some embodiments, the operation at S101 includes: acquiring movement data currently detected and received by the terminal if detecting the trigger event for requesting acquisition of a recommendation message; processing the movement data, to obtain user trigger information, wherein the user trigger information includes movement amplitude information and/or movement frequency information. That is, the movement amplitude information and/or the movement frequency information are/is taken as the user trigger information to perform the corresponding operation.

In some embodiments, a user opens a recommendation message function in an instant messaging application, and the terminal correspondingly displays the interface shown in FIG. 2. After the user shakes or sways the terminal with various efforts, the terminal randomly selects one number based on each shaking or swaying motion, and displays the recommendation message as displayed in the interface shown in FIG. 3 for the user to operate upon selection of all the numbers, so as to facilitate the user to complete purchase of a lottery ticket. In some embodiments, after the user opens the recommendation message function and the interface shown in FIG. 2 is displayed, the user shakes the terminal once to generate a set of lottery numbers, which are displayed to the user through FIG. 3.

Figure 4:
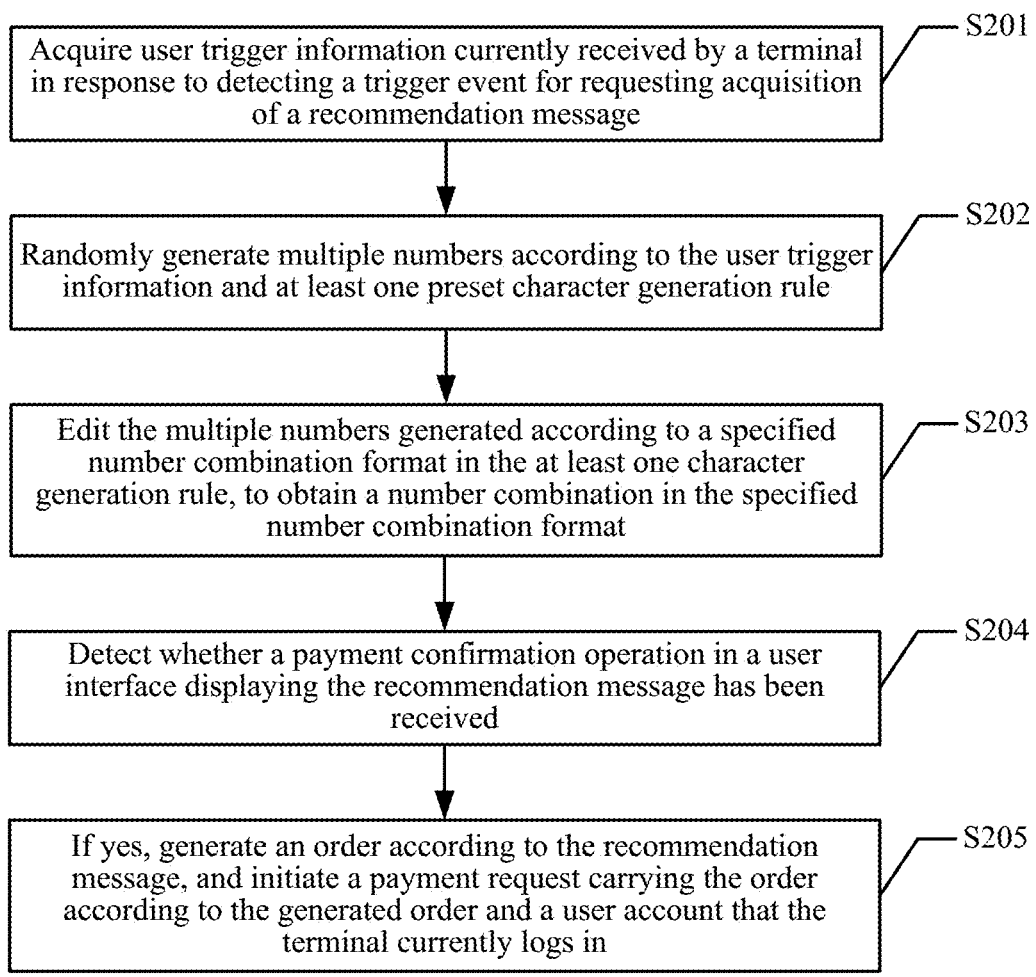
FIG. 4 is a schematic view of a flow of another information processing method according to some embodiments.

FIG. 4 is a schematic view of a flow of another information processing method according to some embodiments. The method illustrated in FIG. 4 may be implemented in mobile smart devices such as tablet PCs, mobile phones, e-readers, remote controls, vehicle equipment or wearable devices. The method includes the following steps.

S201: Acquire user trigger information currently received by a terminal in response to detecting a trigger event for requesting acquisition of a recommendation message.

In some embodiments, the user trigger information currently received by the terminal includes: user trigger information related to the user's shaking or swaying of the terminal, voice information input by the user through a microphone of the terminal, and information about light intensity or light flickering frequency input by the user for a camera of the terminal.

In some embodiments, one or more function buttons are set in applications of the terminal, such as instant messaging applications, social networking applications and payment applications. A user may generate a trigger event for requesting acquisition of a recommendation message with respect to movement of the terminal by clicking on the one or more function buttons.

After the trigger event for requesting acquisition of a recommendation message is detected, an application programming interface (API), such as a terminal movement information API, a voice information acquisition API, an optical signal acquisition API and the like, is called to acquire user trigger information currently sent by the user to the terminal. In some embodiments, the API is called from one or more applications such as instant messaging applications, social networking applications and payment applications. In some embodiments, user trigger information currently sent by the user to the terminal is acquired by a gravity sensor, a sound sensor, an optical sensor, or other apparatuses of the terminal. In some embodiments, the acquired user trigger information is original data (also called raw data) output by the gravity sensor, the sound sensor, the optical sensor, or other apparatuses of the terminal. In some embodiments, the acquired user trigger information is processed data, such as movement locus data, sound amplitude or frequency, light intensity or light flickering frequency and other information, which are obtained by processing the raw data.

S202: Randomly generate multiple numbers according to the user trigger information and at least one preset character generation rule.

S203: Edit the multiple numbers generated according to a specified number combination format in the at least one character generation rule, to obtain a number combination in the specified number combination format.

In some embodiments, the character generation rule includes a rule of randomly generating a character string according to a specified number combination format. When the user trigger information is acquired, after the user sways or shakes the terminal or provides voice input or lighting, a set of numbers in a specified number combination format are randomly generated. The specified number combination format is set according to specific requirements. For example, when a 6+1 number combination format is set for lottery, it is necessary to generate seven different numbers in a specified value range.

S204: Detect whether a payment confirmation operation in a user interface displaying the recommendation message has been received.

S205: If yes, generate an order according to the recommendation message, and initiate a payment request carrying the order according to the generated order and a user account that the terminal is currently logged in.

In some embodiments, the user interface prompts the user in a manner of adding a payment confirmation operation button. After the user clicks on the button, the terminal responds to the user's payment confirmation operation according to a response rule configured for the recommendation message, and initiates a payment procedure, for example, for the lottery recommendation message. In some embodiments, the payment procedure is initiated through a lottery server and a relevant user account of the applications such as instant messaging applications, social networking applications and payment applications as well as a payment account bound thereto. After the order and the user account are acquired, initiating and completing the payment procedure is implemented using known methods. In some embodiments, payment is completed by communicating with the lottery server and a payment server based on the user account.

In some embodiments, after a user issues a trigger event about a recommendation message, a character string is generated based on a movement of a terminal, and a recommendation message is obtained. The recommendation message is automatically generated for the user, which meets the user's demand for automation and intelligence. Moreover, the recommendation message may be designed to facilitate a corresponding payment process for the, which further improves user experience.

Figure 5:
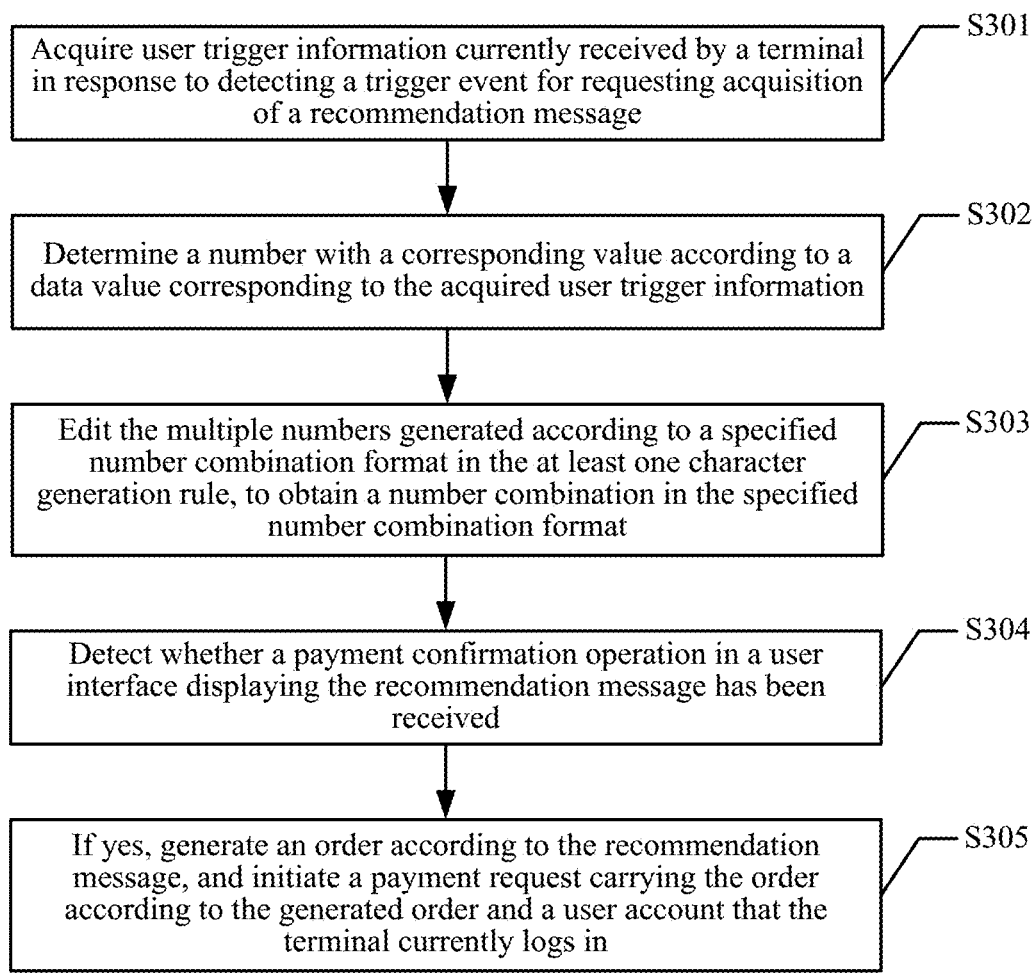
FIG. 5 is a schematic view of a flow of a further information processing method according to some embodiments.

FIG. 5 is a schematic view of a flow of a further information processing method according to some embodiments. The method illustrated in FIG. 5 may be applied to mobile smart devices such as tablet PCs, mobile phones, e-readers, remote controls, vehicle equipment or wearable devices. The method includes the following steps.

S301: Acquire user trigger information currently received by a terminal in response to detecting a trigger event for requesting acquisition of a recommendation message.

In some embodiments, the user's trigger data for the terminal, such as frequency and amplitude of shaking or swaying, voice input, a system clock of the terminal, is obtained. In some embodiments, a character string is generated according to frequency or amplitude or other content. For example, in some embodiments, numbers with large values are generated when the frequency or amplitude is large (e.g., exceeding a predefined threshold). In some embodiments, numbers with smaller values are generated when the frequency of amplitude is large.

In some embodiments, the operation at S301 includes: acquiring a user's trigger data for the terminal currently received by the terminal in response to detecting the trigger event for requesting acquisition of a recommendation message, and determining a valid trigger time period according to characteristic data corresponding to the user's trigger data for the terminal. The characteristic data includes movement frequency and/or movement amplitude, sound amplitude or frequency, light intensity or flashing frequency and the like; and taking characteristic data in the determined valid trigger time period as the user trigger information. In some embodiments, the time range of valid movement is determined according to amplitude and frequency. For example, a time period from when a frequency or amplitude of a shaking or swaying satisfies a certain threshold to when the frequency or amplitude of the shaking or swaying does not satisfy the certain threshold is used as a valid time period, and one or more of the frequency and amplitude of the shaking or swaying during the valid time period are used as the user trigger information.

In some embodiments, the operation at S301 includes: starting timing and acquiring the user's trigger data for the terminal currently received by the terminal in response to detecting the trigger event for requesting acquisition of a recommendation message. When timing reaches a preset duration threshold, characteristic data corresponding to the user's trigger data in a timing range is used as the user trigger information. The characteristic data includes movement frequency and/or movement amplitude, sound amplitude or frequency, light intensity or flashing frequency and the like. For example, a timing clock may be displayed in a user interface after a user issues a trigger event.

S302: Determine a number with a corresponding value according to a data value corresponding to the acquired user trigger information.

In some embodiments, for determining a number with a corresponding value according to a value of characteristic data, configuration is specifically performed according to the user's own demand. For example, in some embodiments, when the swaying amplitude or frequency is large (e.g., exceeding a predefined threshold), numbers with large values are generated in a specified value range. When the swaying amplitude is small (e.g., less than the predefined threshold), numbers with smaller values are generated. In some embodiments, when the value of the sound amplitude is large (e.g., exceeding a predefined sound amplitude threshold), numbers with large values are generated. When the value of sound amplitude is small (e.g., less than the predefined sound amplitude threshold), numbers with smaller values are generated.

S303: Edit the multiple numbers generated according to a specified number combination format in the at least one character generation rule, to obtain a number combination in the specified number combination format.

In some embodiments, the at least one character generation rule includes a rule of randomly generating a character string according to a specified number combination format and characteristic data. Numbers are generated based on specific frequency or amplitude, and the specified number combination format may be set according to specific requirements. For example, when a 6+1 number combination format is set for lottery, it is necessary to generate seven different numbers in a specified value range.

S304: Detect whether a payment confirmation operation in a user interface displaying the recommendation message has been received.

S305: If yes, generate an order according to the recommendation message, and initiate a payment request carrying the order according to the generated order and a user account that the terminal currently logs in.

In some embodiments, the user interface prompts the user in a manner of adding a payment confirmation operation button. After the user clicks on the button, the terminal responds to the user's payment confirmation operation according to a response rule configured for the recommendation message, and initiates a payment procedure. For example, in some embodiments, for the lottery recommendation message, the payment procedure is initiated through a lottery server and a relevant user account of the applications such as instant messaging applications, social networking applications and payment applications as well as a payment account bound thereto. After the order and the user account are acquired, initiating and completing the payment procedure are implemented using known methods. Payment may be completed by communicating with the lottery server and a payment server based on the user account.

Information processing apparatuses and systems according to the embodiments of the present application are described in detail below.

Figure 6:
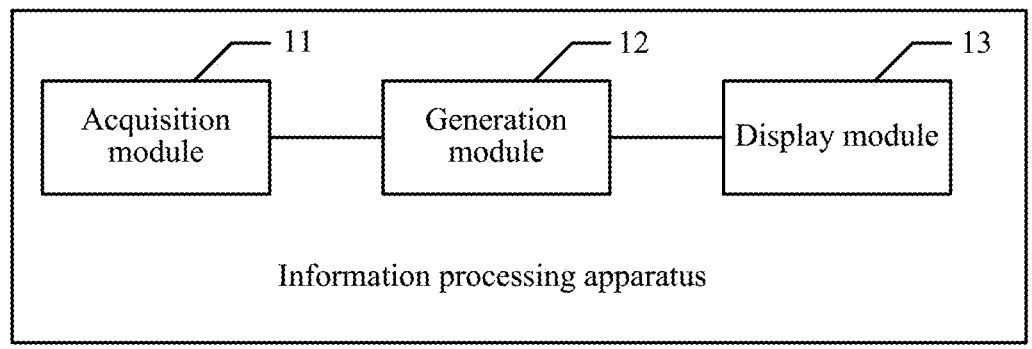
FIG. 6 is a schematic structural view of an information processing apparatus according to some embodiments.

FIG. 6 is a schematic structural view of an information processing apparatus according to some embodiments. The apparatus illustrated in FIG. 6 may be disposed in mobile smart devices such as tablet PCs, mobile phones, e-readers, remote controls, vehicle equipment or wearable devices.

The apparatus includes an acquisition module 11, for acquiring user trigger information currently received by a terminal in response to detecting a trigger event for requesting acquisition of a recommendation message.

The apparatus includes a generation module 12, for generating information about at least one set of character strings correspondingly according to the acquired user trigger information and at least one preset character generation rule.

The apparatus includes a display module 13, for generating a recommendation message according to the information about at least one set of character strings, and displaying the recommendation message in a preset user interface.

In some embodiments, corresponding function buttons are set in applications of the terminal, such as instant messaging applications, social networking applications and payment applications. A user may generate a trigger event for requesting acquisition of a recommendation message with respect to movement of the terminal by clicking on the function buttons.

The acquisition module 11 for acquiring user trigger information currently received, such as user trigger information related to the user's shaking or swaying for the terminal, voice information input by the user through a microphone of the terminal, and information about light intensity or light flickering frequency input by the user for a camera of the terminal.

After the acquisition module 11 detects the trigger event for requesting acquisition of a recommendation message, an application programming interface (API), such as a terminal movement information API, a voice information acquisition API, an optical signal acquisition API and the like, is called to acquire user trigger information currently sent by the user to the terminal. In some embodiments, the API is called from one or more applications such as instant messaging applications, social networking applications and payment applications. In some embodiments, user trigger information currently sent by the user to the terminal is acquired by a gravity sensor, a sound sensor, an optical sensor, or other apparatuses of the terminal. In some embodiments, the acquired user trigger information is original data (also called raw data) output by the gravity sensor, the sound sensor, the optical sensor, or other apparatuses of the terminal. In some embodiments, the acquired user trigger information is processed data, such as movement locus data, sound amplitude or frequency, light intensity or light flickering frequency and other information, which are obtained by processing the raw data.

In some embodiments, the character generation rule is configured as required. In some embodiments, the character generation rule includes any one or more combinations of the following manners: randomly generating a corresponding character string when acquiring the user trigger information, generating a corresponding character string according to a specified array format after acquiring the user trigger information, and generating a corresponding character string according to frequency and/or amplitude and other information corresponding to the user trigger information and according to a specified array format. In some embodiments, the generation module 12 respectively determines different character string information. For example, in terms of the lottery, when it is acquired that the terminal is moving, it is feasible to randomly generate a set of character strings including seven number combinations, or generate a set of character strings including seven number combinations according to movement frequency and/or amplitude at the same time.

In some embodiments, the display module 13 specifically edits the generated character strings according to a preset character display template. For example, for the set of character strings including a seven number combination generated for the lottery, in some embodiments, the display module 13 performs 6+1 display according to a preset display panel for the lottery. If necessary, different colors may be used to distinguish each character (number) in the character strings.

Figure 7:
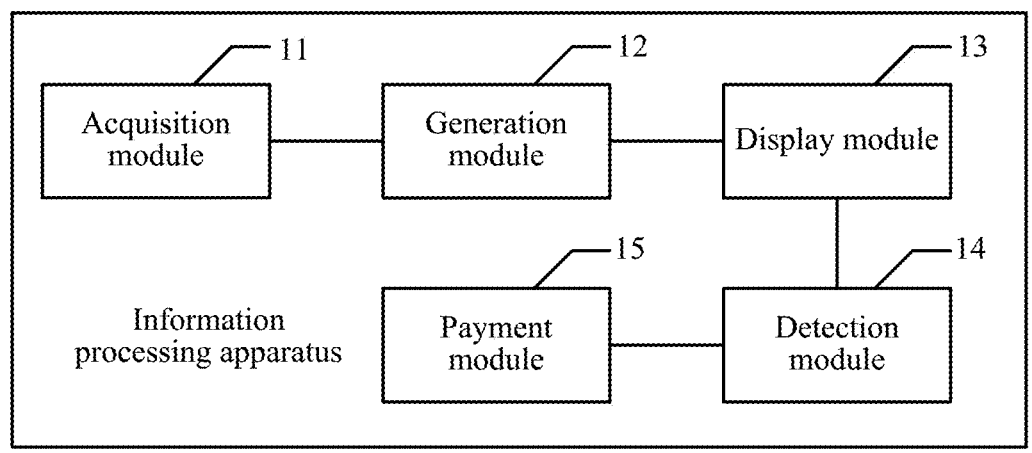
FIG. 7 is a schematic structural view of another information processing apparatus according to some embodiments.

FIG. 7 is a schematic structural view of another information processing apparatus according to some embodiments. The apparatus illustrated in FIG. 7 includes the acquisition module 11, the generation module 12 and the display module 13 as described above with respect to FIG. 6. The apparatus also includes a detection module 14, for detecting whether a payment confirmation operation in a user interface displaying the recommendation message has been received. The apparatus also includes a payment module 15, for, when a detection result of the detection module is yes, generating an order according to the recommendation message, and initiating a payment request carrying the order according to the generated order and a user account that the terminal is currently logged in.

In some embodiments, the user interface prompts the user in a manner of adding a payment confirmation operation button, and after the user clicks on the button, the detection module 14 immediately responds to the user's payment confirmation operation according to a response rule configured for the recommendation message, and the payment module 15 initiates a payment procedure. For example, for the lottery recommendation message, the payment procedure is initiated through a lottery server and a relevant user account of the applications such as instant messaging applications, social networking applications and payment applications as well as a payment account bound thereto. After the order and the user account are acquired, initiating and completing the payment procedure are implemented with the prior art, and the payment module 15 specifically completes payment by communicating with the lottery server and a payment server based on the user account.

Figure 8:
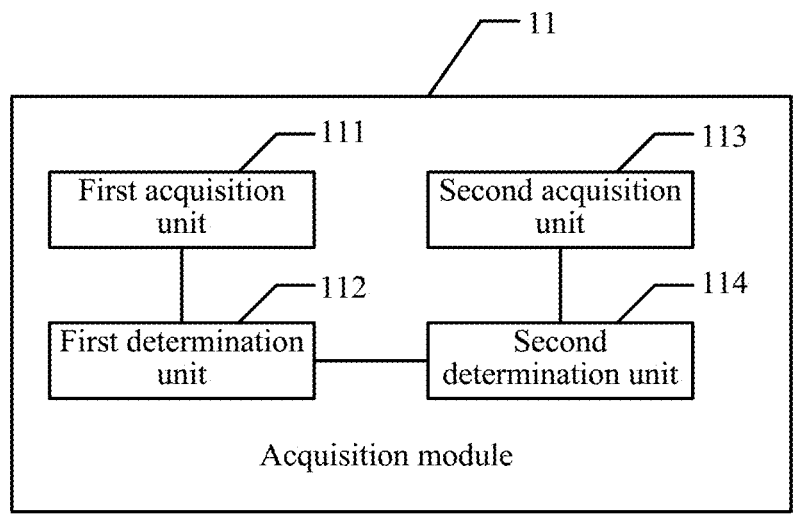
FIG. 8 is one schematic structural view of the acquisition module in FIG. 7.

FIG. 8 illustrates that, in some embodiments, the acquisition module 11 includes a first acquisition unit 111, for acquiring a user's trigger data for the terminal currently received by the terminal in response to detecting the trigger event for requesting acquisition of a recommendation message, and determining a valid trigger time period according to characteristic data corresponding to the acquired user's trigger data for the terminal. The acquisition module 11 also includes a first determination unit 112, for taking characteristic data in the determined valid trigger time period as the user trigger information.

The time range of valid movement may be determined according to information such as amplitude and frequency, for example, a time period from that shaking or swaying frequency or amplitude reaches a certain threshold to that the shaking or swaying frequency or amplitude is less than a certain threshold may be taken as a valid time period, and the first determination unit 112 may take frequency and/or amplitude in the time period as the user trigger information.

The acquisition module 11 further includes a second acquisition unit 113, for starting timing and acquiring the user's trigger data for the terminal currently received by the terminal if detecting the trigger event for requesting acquisition of a recommendation message; and a second determination unit 114, for, when timing reaches a preset duration threshold, taking characteristic data corresponding to the user's trigger data in a timing range as the user trigger information.

In some embodiments, a timing clock may be displayed in a user interface after a user issues a trigger event, and information such as frequency and/or amplitude in the timing clock is taken as the user trigger information.

Figure 9:
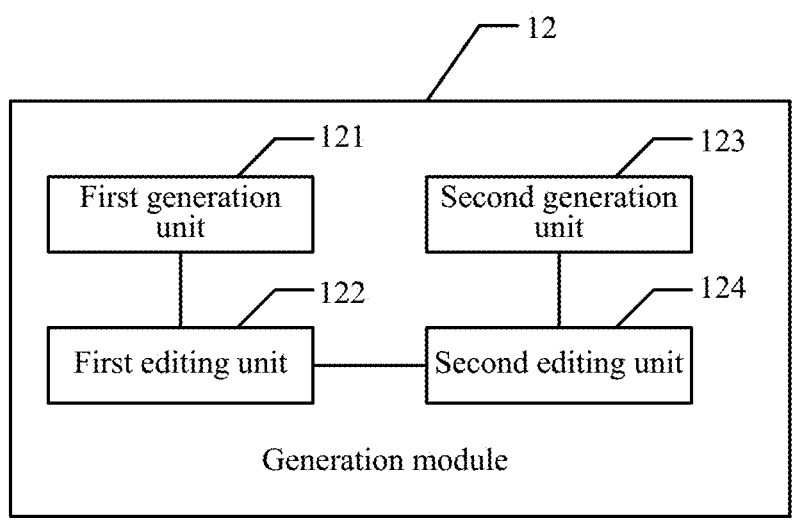
FIG. 9 is one schematic structural view of the generation module in FIG. 7.

FIG. 9 illustrates that the generation module 12 includes a first generation unit 121, for randomly generating multiple numbers according to the user trigger information and at least one preset character generation rule. In some embodiments, the at least one character generation rule includes a rule of randomly generating a character string according to a specified number combination format.

The generation module 12 includes a first editing unit 122, for editing the multiple numbers generated according to a specified number combination format in the at least one character generation rule, to obtain a number combination in the specified number combination format.

The first generation unit 121, after acquiring the user trigger information (e.g., after the user sways or shakes the terminal or provides voice input or lighting), randomly generates a set of numbers in a specified number combination format. The first editing unit 122 completes a number editing operation, and the specified number combination format is set according to specific requirements. For example, when a 6+1 number combination format is set for the lottery, it is necessary to generate seven different numbers in a specified value range.

The at least one character generation rule includes a rule of randomly generating a character string according to a specified number combination format and characteristic data. The generation module 12 includes a second generation unit 123, for acquiring current user trigger information of the terminal, and determining a number with a corresponding value according to a data value corresponding to the acquired user trigger information; and a second editing unit 124, for editing the multiple numbers generated according to a specified number combination format in the at least one character generation rule, to obtain a number combination in the specified number combination format.

For the manner of determining a number with a corresponding value according to a value of characteristic data, in some embodiments, the second generation unit 123 performs configuration specifically according to the user's own demand, for example, when the swaying amplitude or frequency is greater, numbers with greater values are generated in the specified value range, and otherwise, numbers with smaller values are generated; or, when the value of the sound amplitude is higher, numbers with greater values are generated, and otherwise, numbers with smaller values are generated. The second generation unit 123 generates numbers based on specific frequency or amplitude, the second editing unit 124 edits the numbers generated, and the specified number combination format is set according to specific requirements. For example, when a 6+1 number combination format is selected for the lottery, it is necessary to generate seven different numbers in a specified value range.

Figure 10:
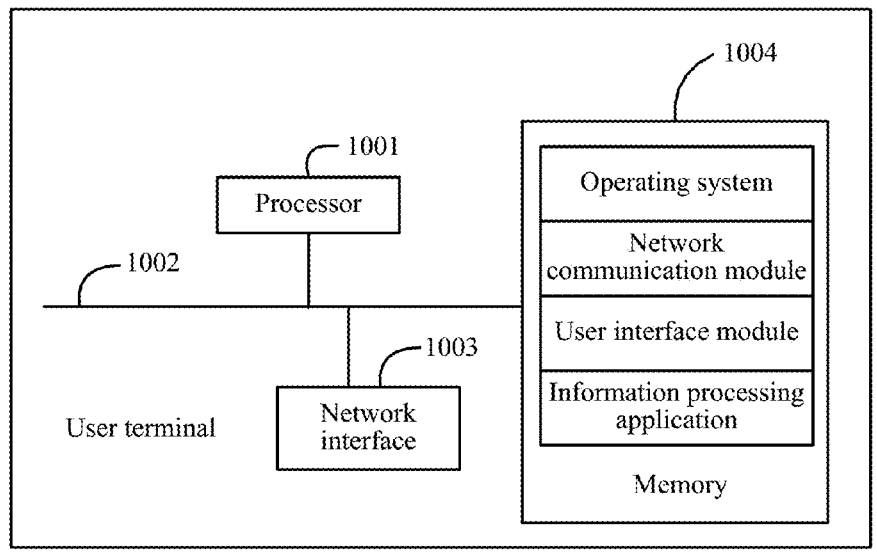
FIG. 10 is a schematic structural view of a user terminal according to some embodiments.

FIG. 10 is a schematic structural view of a user terminal according to some embodiments. The user terminal illustrated in FIG. 10 may be a mobile smart device such as a tablet PC, a mobile phone, an e-reader, a remote control, vehicle equipment or a wearable device.

The user terminal includes: at least one processor 1001, for example, CPU, at least one communication bus 1002, at least one network interface 1003 and a memory 1004. The communication bus 1002 is used for implementing connections and communications between the components. The network interface 1003 alternatively may include standard wired interfaces and wireless interfaces (e.g., Wi-Fi or mobile communication interfaces). The memory 1004 may be a high-speed RAM memory, or may be a non-volatile memory (e.g., at least one magnetic disk memory). Alternatively, the memory 1004 may be at least one storage device located away from the processor 1001. As shown in FIG. 10, as a computer storage medium, the memory 1004 stores an operating system and a network communication module, and stores information processing applications and other programs.

In some embodiments, the processor 1001 is used for calling the information processing applications stored in the memory 1004, and performing the following steps: acquiring user trigger information currently received by a terminal in response to detecting a trigger event for requesting acquisition of a recommendation message; generating information about at least one set of character strings correspondingly according to the acquired user trigger information and at least one preset character generation rule; and generating a recommendation message according to the information about at least one set of character strings, and displaying the recommendation message in a preset user interface.

When performing the step of acquiring user trigger information currently received by a terminal in response to detecting a trigger event for requesting acquisition of a recommendation message, the processor 1001 performs the following steps: acquiring a user's trigger data for the terminal currently received by the terminal in response to detecting the trigger event for requesting acquisition of a recommendation message; determining a valid trigger time period according to characteristic data corresponding to the acquired user's trigger data for the terminal; and taking characteristic data in the determined valid trigger time period as the user trigger information.

When performing the step of acquiring user trigger information currently received by a terminal in response to detecting a trigger event for requesting acquisition of a recommendation message, the processor 1001 performs the following steps: starting timing and acquiring the user's trigger data for the terminal currently received by the terminal in response to detecting the trigger event for requesting acquisition of a recommendation message; and when timing reaches a preset duration threshold, taking characteristic data corresponding to the user's trigger data in a timing range as the user trigger information.

The at least one character generation rule includes a rule of randomly generating a character string according to a specified number combination format; and when performing the step of generating information about at least one set of character strings correspondingly according to the acquired user trigger information and at least one preset character generation rule, in some embodiments, the processor 1001 performs the following steps: randomly generating multiple numbers according to the user trigger information and at least one preset character generation rule; and editing the multiple numbers generated according to a specified number combination format in the at least one character generation rule, to obtain a number combination in the specified number combination format.

The at least one character generation rule includes a rule of randomly generating a character string according to a specified number combination format and characteristic data. When performing the step of generating information about at least one set of character strings correspondingly according to the acquired user trigger information and at least one preset character generation rule, in some embodiments, the processor 1001 performs the following steps: determining a number with a corresponding value according to a data value corresponding to the acquired user trigger information; and editing the multiple numbers generated according to a specified number combination format in the at least one character generation rule, to obtain a number combination in the specified number combination format.

In some embodiments, the processor 1001 further performs the following steps: detecting whether a payment confirmation operation in a user interface displaying the recommendation message has been received; and if yes, generating an order according to the recommendation message, and initiating a payment request carrying the order according to the generated order and a user account that the terminal currently logs in.

Figure 11:
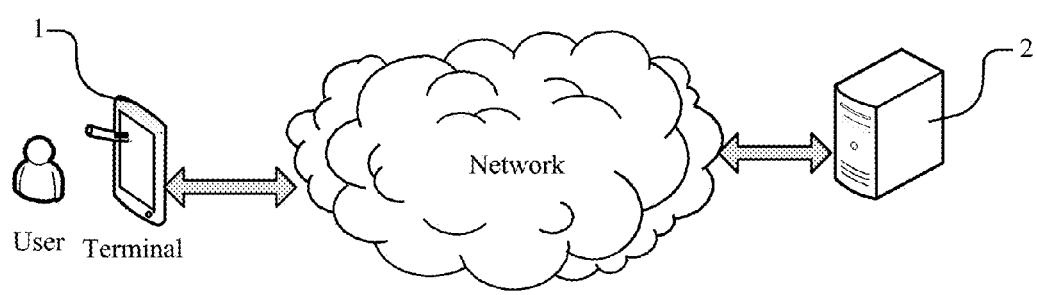
FIG. 11 is a schematic structural view of a payment system according to some embodiments.

FIG. 11 is a schematic structural view of a payment system according to some embodiments. The system illustrated in FIG. 11 includes: a terminal 1 and a server 2.

The terminal 1 is used for acquiring user trigger information currently received by a terminal in response to detecting a trigger event for requesting acquisition of a recommendation message; generating information about at least one set of character strings correspondingly according to the acquired user trigger information and at least one preset character generation rule; generating a recommendation message according to the information about at least one set of character strings, and displaying the recommendation message in a preset user interface; and when detecting a payment confirmation operation in a user interface displaying the recommendation message, generating an order according to the recommendation message, and initiating a payment request carrying the order according to the generated order and a user account that the terminal currently logs in to the server 2.

The server 2 is used for completing payment of the order carried in the payment request according to the received payment request.

The terminal 1 may be a mobile smart device such as a tablet PC, a mobile phone, an e-reader, a remote control, vehicle equipment or a wearable device, corresponding function buttons may be set in applications of the terminal, such as instant messaging applications, social networking applications and payment applications, and a user may generate a trigger event for requesting acquisition of a recommendation message with respect to movement of the terminal by clicking on the function buttons, to initiate the process of obtaining the recommendation message and generating an order. The server 2 may be corresponding servers of applications such as instant messaging applications, social networking applications and payment applications or a payment server, for completing payment according to a user order and a user account. After the order and the user account are acquired, initiating and completing the payment procedure may be implemented using known methods. Payment may be completed by communicating with the lottery server and a payment server based on the user account.

Figure 12:
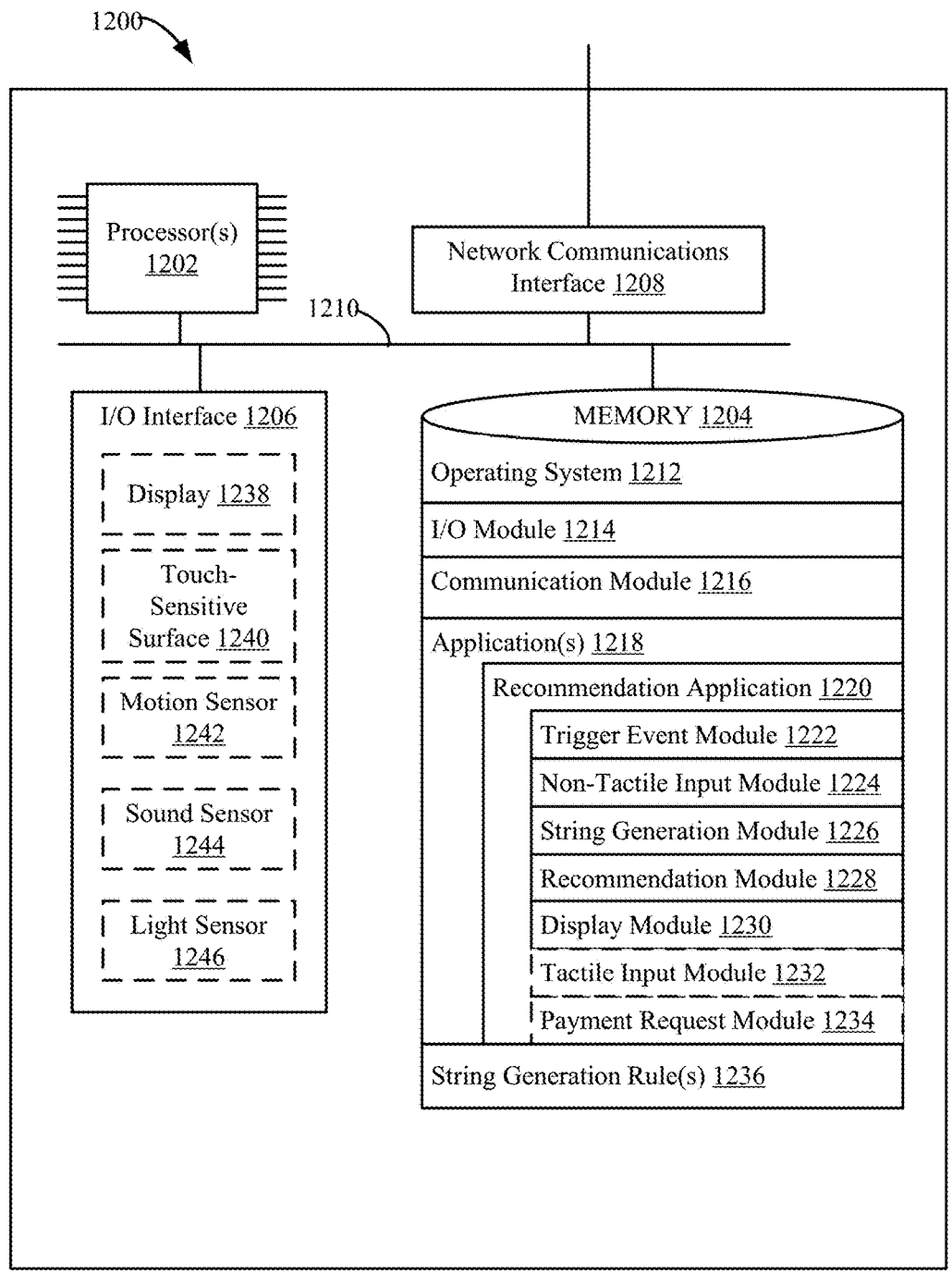
FIG. 12 is a block diagram of a portable electronic device in accordance with some embodiments.

FIG. 12 is a block diagram of a portable electronic device 1200 in accordance with some embodiments. In some embodiments, the portable electronic device 1200 corresponds to the terminal 1 described above with respect to FIG. 11.

As shown in FIG. 12, the device 1200 includes one or more processing units (also called herein "processors") 1202, memory 1204, an input/output (I/O) interface 1206, and a network communications interface 1208. These components communicate with one another over one or more communication buses or signal lines 1210. In some embodiments, the memory 1204, or the computer readable storage media of memory 1204, stores programs, modules, instructions, and data structures including all or a subset of: an operating system 1212, an I/O module 1214, a communication module 1216, and one or more applications 1218. The one or more processors 1202 are coupled to the memory 1204 and operable to execute these programs, modules, and instructions, and reads/writes from/to the data structures.

In some embodiments, the processing units 1202 include one or more microprocessors, such as a single core or multi-core microprocessor. In some embodiments, the processing units 1202 include one or more general purpose processors. In some embodiments, the processing units 1202 include one or more special purpose processors.

In some embodiments, the memory 1204 includes high-speed random access memory, such as DRAM, SRAM, DDR RAM or other random access solid state memory devices. In some embodiments the memory 1204 includes non-volatile memory, such as one or more magnetic disk storage devices, optical disk storage devices, flash memory devices, or other non-volatile solid state storage devices. In some embodiments, the memory 1204 includes one or more storage devices remotely located from the processing units 1202. The memory 1204, or alternately the non-volatile memory device(s) within the memory 1204, comprises a computer readable storage medium. In some embodiments, the memory 1204 comprises a non-transitory computer readable storage medium.

In some embodiments, the I/O interface 1206 couples one or more input/output devices, such as one or more displays 1238 (e.g., a touch-sensitive display, also called a touch screen), a keyboards, touch screens, speakers, and microphones, to the I/O module 1214 of the device 1200. The I/O interface 1206, in conjunction with the I/O module 1214, receive user inputs (e.g., voice input, keyboard inputs, touch inputs, etc.) and process them accordingly. The I/O interface 1206 and the I/O module 1214 also present outputs (e.g., sounds, images, text, etc.) to the user according to various program instructions implemented on the device 1200.

In some embodiments, the network communications interface 1208 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, WiFi, VoIP, Wi-MAX, or any other suitable communication protocol. The network communications interface 1208 enables communication between the device 1200 with networks, such as the Internet, an intranet and/or a wireless network, such as a cellular telephone network, a wireless local area network (LAN) and/or a metropolitan area network (MAN), and other devices. The communications module 1216 facilitates communications between the device 1200 and other devices (e.g., the payment server 2 illustrated in FIG. 11) over the network communications interface 1208.

In some embodiments, the operating system 1212 (e.g., Darwin, RTXC, LINUX, UNIX, OS X, WINDOWS, iOS, Android, or an embedded operating system such as VxWorks) includes various software components and/or drivers for controlling and managing general system tasks (e.g., memory management, storage device control, power management, etc.) and facilitates communications between various hardware, firmware, and software components.

It should be noted that the device 1200 is only one example, and that the device 1200 may have more or fewer components than shown, may combine two or more components, or may have a different configuration or arrangement of the components. The various components shown in FIG. 12 may be implemented in hardware, software, firmware, including one or more signal processing and/or application specific integrated circuits, or a combination of thereof.

In FIG. 12, the recommendation application 1220 stored in the memory 1204 include the following modules or a subset or a superset thereof:

Trigger Event Module 1222 configured for detecting a trigger event based on a user input;

Non-Tactile Input Module 1224 configured for receiving non-tactile user input;

String Generation Module 1226 configured for generating one or more character strings based on the non-tactile user input and one or more predefined string generation rules;

Recommendation Module 1228 configured for generating a recommendation message that includes one or more character strings; and Display Module 1230 configured for displaying the recommendation message;

(Optional) Tactile Input Module 1232 configured for receiving tactile input; and (Optional) Payment Request Module 1234 configured for sending a payment request to an external server.

In some embodiments, the memory 1204 stores one or more string generation rules 1236. In some embodiments, a string generation rule of the one or more string generation rules 1236 includes information identifying one or more of: a number of entries to be generated, whether each entry consist of numeric characters, non-numeric characters, or both, and a range of each entry (e.g., a number range, or a range of characters, such as from A through F).

Details of the structures, functions, and interactions of these modules are provided with respect to FIGS. 1-11 and 13 and accompanying descriptions.

Figure 13B:
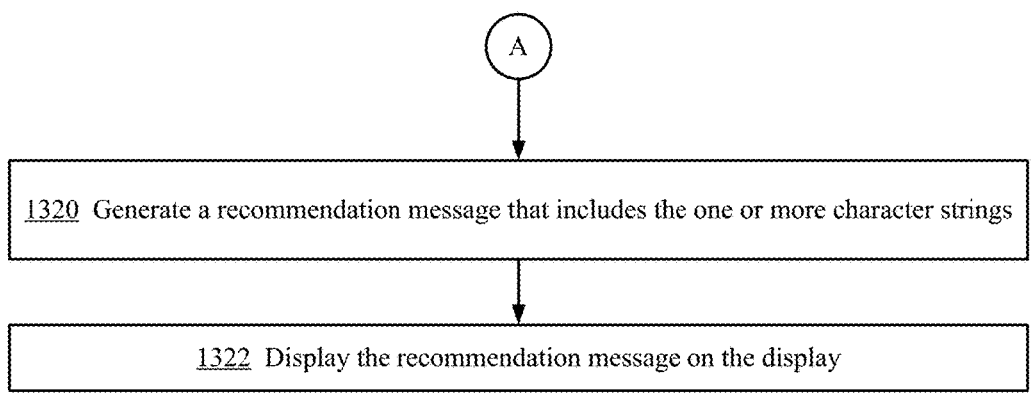

FIGS. 13A-13B illustrate a flow chart of an exemplary method for presenting a recommendation message in accordance with some embodiments.

In some embodiments, the method is performed by a portable electronic device (e.g., the portable electronic device 1200 in FIG. 12) with display (e.g., display 1238 in FIG. 12), memory (e.g., memory 1204 in FIG. 12) and one or more processors (e.g., processor 1202 in FIG. 12).

The device detects (1302) a trigger event based on a user input. The trigger event initiates a receipt of non-tactile user input. In some embodiments, the trigger event corresponds to a user pressing a hardware button on the device. In some embodiments, the trigger event corresponds to the user selecting a user interface element displayed on the display of the device.

In some embodiments, the portable electronic device includes (1304) a touch-sensitive surface (e.g., a touch pad that is located separately from the display or a touch-sensitive display that is integrated with the display) configured for receiving a tactile input and one or more non-tactile sensors (e.g., the motion sensor 1242, the sound sensor 1244, and the light sensor 1246 illustrated in FIG. 12). The trigger event based on the user input is detected by the touch-sensitive surface. The non-tactile user input (e.g., a shaking or swaying motion of the device, a voice input, or a light input) is received by at least one of the one or more non-tactile sensors.

In some embodiments, the one or more non-tactile sensors include (1306) one or more of: a motion sensor (e.g., an accelerometer, a gravity sensor, or a gyroscope) configured to detect shaking or swaying of the portable electronic device; a sound sensor (e.g., a microphone) configured to receive a voice input; and a light sensor (e.g., a charge-coupled device or a CMOS sensor) configured to detect light.

In response to detecting the trigger event, the device receives (1308) non-tactile user input. In some embodiments, receiving the non-tactile user input includes recording (or storing) the non-tactile user input.

The device generates (1310) one or more character strings based on the non-tactile user input and one or more predefined string generation rules. Each character string of the one or more character strings includes multiple characters. For example, in some embodiments, the device generates a character string that includes multiple entries, each entry of the multiple entries including a number. In some embodiments, the number is selected within a predefined range.

In some embodiments, the one or more character strings include (1312) a set of random numbers generated based on the non-tactile user input. In some embodiments, the one or more character strings are generated randomly or pseudo-randomly. In some embodiments, the one or more character strings include random numbers (or characters). For example, in some embodiments, a random number (or a pseudo-random number) of the random numbers is generated by a random number generator. In some embodiments, the random number generator requires a seed (e.g., a number), and the seed is determined based on the non-tactile user input. For example, in some embodiments, amplitude or frequency of the non-tactile user input is used as the seed. In some embodiments, the amplitude or frequency of the non-tactile user input is processed (e.g., scaled and/or offset), and the processed amplitude or frequency is used as the seed.

In some embodiments, a portion of the non-tactile user input that satisfies one or more predefined criterion is used (1314) for generating the one or more character strings. For example, when the non-tactile user input has a portion that satisfies the one or more predefined criterion and a portion that does not satisfy the one or more predefined criterion, the portion that does not satisfy the one or more predefined criterion is not used in generating the one or more character strings (e.g., disregarded).

In some embodiments, amplitude of the non-tactile user input is used (1316) for generating the one or more character strings. For example, a velocity of the device is used for generating the one or more character strings when the motion sensor is used. In another example, a volume of a sound input is used for generating the one or more character strings when the sound sensor is used. In yet another example, an intensity of light is used for generating the one or more character strings when the light sensor is used. In some embodiments, a combination of amplitude values from multiple sensors is used for generating the one or more character strings.

In some embodiments, frequency of the non-tactile user input is used for generating the one or more character strings (e.g., a frequency of shaking the device).

In some embodiments, the one or more character strings include (1318) recommended numbers for a lottery ticket (e.g., recommended numbers, 05, 06, 07, 31, 32, 33, and 14, as illustrated in FIG. 3).

The device generates (1320, FIG. 13B) a recommendation message that includes the one or more character strings. For example, as illustrated in FIG. 3, the recommendation message includes the one or more character strings (e.g., recommended numbers, 05, 06, 07, 31, 32, 33, and 14).

The device displays (1322) the recommendation message on the display.

In some embodiments, the recommendation message includes (1324) a user interface element for making a payment (e.g., the "purchase" icon as illustrated in FIG. 3). The device, while displaying the recommendation message, receives a user selection of the user interface element for making the payment (e.g., a user touching the "purchase" icon on a touch-sensitive display). The device, in response to receiving the user selection of the user interface element for making the payment, sends a payment request to an external server.

While particular embodiments are described above, it will be understood that the scope of claims are not limited to these particular embodiments. On the contrary, the claims include alternatives, modifications and equivalent embodiments that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles described herein and their practical applications, to thereby enable others skilled in the art to best utilize various embodiments with various modifications as are suited to the particular use contemplated.

What is claimed is:

1. A method for presenting a recommendation message, performed by a portable electronic device with display, memory, and one or more processors, the method comprising:
   detecting a trigger event based on a user input in an application running on the portable electronic device, the trigger event initiating a predefined time window for receipt of a non-tactile user input;
   in response to detecting the trigger event, receiving sensor data captured by a motion sensor of the portable electronic device resulting from a non-tactile user input, wherein the sensor data is captured within the predefined time window;
   determining whether values of the sensor data captured by the motion sensor satisfy a predefined movement pattern of the portable electronic device;
   in response to determining that the values of the sensor data satisfy the predefined movement pattern of the portable electronic device, generating one or more character strings based, at least in part, on the values of the sensor data, each character string of the one or more character strings including multiple characters;
   generating a recommendation message that includes the one or more character strings; and
   displaying the recommendation message on the display.

2. The method of claim 1, wherein:
   the portable electronic device includes a touch-sensitive surface for receiving a tactile input; and
   detecting the trigger event comprising receiving a tactile input at the touch-sensitive surface of the portable electronic device.

3. The method of claim 2, wherein the
   motion sensor is configured to detect shaking or swaying of the portable electronic device; and
   the sensor data corresponds to the detected shaking or swaying of the portable electronic device.

4. The method of claim 1, wherein the one or more character strings include a set of random numbers generated based on the non-tactile user input.

5. The method of claim 1, wherein:
   the recommendation message includes a user interface element for making a payment; and
   the method further includes:
      while displaying the recommendation message, receiving a user selection of the user interface element for making the payment; and
      in response to receiving the user selection of the user interface element for making the payment, sending a payment request to an external server.

6. The method of claim 1, wherein generating the one or more character strings based on the values of the sensor data comprises:
   generating the one or more character strings in a first specified value range upon determining that the values of the sensor data satisfy a criterion; and
   generating the one or more character strings in a second specified value range upon determining that the values of the sensor data do not satisfy the criterion, wherein the second specified value range is less than the first specified value range.

7. The method of claim 1, further comprising:
   receiving additional sensor data captured by a light sensor of the portable electronic device resulting from the non-tactile user input, wherein the additional sensor data is captured during the predefined time window; and
   determining whether values of the additional sensor data captured by the light sensor satisfy a light frequency pattern;
   wherein generating the one or more character strings is further based on the values of the additional sensor data, in response to determining that the values of the additional sensor data satisfy the light frequency pattern.

8. A portable electronic device for presenting a recommendation message, comprising:
   a display;
   a motion sensor;
   one or more processors; and
   memory storing one or more programs for execution by the one or more processors, the one or more programs including instructions for:
      detecting a trigger event based on a user input in an application running on the portable electronic device, the trigger event initiating a predefined time window for receipt of a non-tactile user input;
      in response to detecting the trigger event, receiving sensor data captured by the motion sensor resulting from a non-tactile user input, wherein the sensor data is captured within the predefined time window;
      determining whether values of the sensor data captured by the motion sensor satisfy a predefined movement pattern of the portable electronic device;
      in response to determining that the values of the sensor data satisfy the predefined movement pattern of the portable electronic device, generating one or more character strings based, at least in part, on the values of the sensor data, each character string of the one or more character strings including multiple characters;

generating a recommendation message that includes the one or more character strings; and displaying the recommendation message on the display.

9. The device of claim 8, further comprising a touch-sensitive surface configured for receiving a tactile input, wherein:

detecting the trigger event comprising receiving a tactile input at the touch-sensitive surface of the portable electronic device.

10. The device of claim 9, wherein the motion sensor is configured to detect shaking or swaying of the portable electronic device; and the sensor data corresponds to the detected shaking or swaying of the portable electronic device.

11. The device of claim 8, wherein the one or more character strings include a set of random numbers generated based on the non-tactile user input.

12. The device of claim 8, wherein:

the recommendation message includes a user interface element for making a payment; and the one or more programs further include instructions for:

while displaying the recommendation message, receiving a user selection of the user interface element for making the payment; and in response to receiving the user selection of the user interface element for making the payment, sending a payment request to an external server.

13. The device of claim 8, wherein generating the one or more character strings based on the values of the sensor data comprises:

generating the one or more character strings in a first specified value range upon determining that the values of the sensor data satisfy a criterion; and generating the one or more character strings in a second specified value range upon determining that the values of the sensor data do not satisfy the criterion, wherein the second specified value range is less than the first specified value range.

14. The device of claim 8, wherein the one or more programs further include instructions for:

receiving additional sensor data captured by a light sensor of the portable electronic device resulting from the non-tactile user input, wherein the additional sensor data is captured during the predefined time window; and determining whether values of the additional sensor data captured by the light sensor satisfy a light frequency pattern;

wherein generating the one or more character strings is further based on the values of the additional sensor data, in response to determining that the values of the additional sensor data satisfy the light frequency pattern.

15. A non-transitory computer readable storage medium storing one or more programs for execution by one or more processors of a portable electronic device, the one or more programs including instructions for:

detecting a trigger event based on a user input in an application running on the portable electronic device, the trigger event initiating a predefined time window for receipt of a non-tactile user input;

in response to detecting the trigger event, receiving sensor data captured by a motion sensor of the portable electronic device resulting from a non-tactile user input, wherein the sensor data is captured within the predefined time window;

determining whether values of the sensor data captured by the motion sensor satisfy a predefined movement pattern of the portable electronic device;

in response to determining that the values of the sensor data satisfy the predefined movement pattern of the portable electronic device, generating one or more character strings based, at least in part, on the values of the sensor data, each character string of the one or more character strings including multiple characters;

generating a recommendation message that includes the one or more character strings; and displaying the recommendation message on the display.

16. The computer readable storage medium of claim 15, wherein:

the portable electronic device includes a touch-sensitive surface configured for receiving a tactile input; and detecting the trigger event comprising receiving a tactile input at the touch-sensitive surface of the portable electronic device.

17. The computer readable storage medium of claim 16, wherein the motion sensor is configured to detect shaking or swaying of the portable electronic device; and the sensor data corresponds to the detected shaking or swaying of the portable electronic device.

18. The computer readable storage medium of claim 15, wherein the one or more character strings include a set of random numbers generated based on the non-tactile user input.

19. The computer readable storage medium of claim 15, wherein:

the recommendation message includes a user interface element for making a payment; and the one or more programs further include instructions for:

while displaying the recommendation message, receiving a user selection of the user interface element for making the payment; and in response to receiving the user selection of the user interface element for making the payment, sending a payment request to an external server.

20. The computer readable storage medium of claim 15, wherein generating the one or more character strings based on the values of the sensor data comprises:

generating the one or more character strings in a first specified value range upon determining that the values of the sensor data satisfy a criterion; and generating the one or more character strings in a second specified value range upon determining that the values of the sensor data do not satisfy the criterion, wherein the second specified value range is less than the first specified value range.

21. The computer readable storage medium of claim 15, wherein the one or more programs further include instructions for:

receiving additional sensor data captured by a light sensor of the portable electronic device resulting from the non-tactile user input, wherein the additional sensor data is captured during the predefined time window; and determining whether values of the additional sensor data captured by the light sensor satisfy a light frequency pattern;

wherein generating the one or more character strings is further based on the values of the additional sensor data, in response to determining that the values of the additional sensor data satisfy the light frequency pattern.

* * * * *